United States Patent [19]

Mailloux et al.

[11] 4,234,250

[45] Nov. 18, 1980

[54] ELECTROPHOTOGRAPHIC PRINTING SYSTEM

[75] Inventors: Louis D. Mailloux, Webster; William M. Reilich, Ontario, both of N.Y.

[73] Assignee: Xerox Corporation, Stamford, Conn.

[21] Appl. No.: 816,126

[22] Filed: Jul. 15, 1977

[51] Int. Cl.[3] .......... G02B 27/17

[52] U.S. Cl. .......... 355/4; 346/76 L; 355/3 R; 355/7; 355/8

[58] Field of Search .......... 96/1 R; 355/3 R, 8, 355/14, 4, 7; 346/76 L

[56] References Cited

U.S. PATENT DOCUMENTS

| | | | |
|---|---|---|---|
| 3,780,214 | 12/1973 | Bestenreiner et al. | 346/76 L |
| 3,893,854 | 7/1975 | Honjo et al. | 96/1.5 |
| 3,906,897 | 9/1975 | Davidson | 355/15 |
| 3,909,254 | 9/1975 | Tamai et al. | 96/1 R |
| 3,934,549 | 1/1976 | Davidson | 355/15 |
| 3,936,182 | 8/1974 | Sheikh | 355/14 |
| 4,014,607 | 3/1977 | Cherian | 355/3 R |
| 4,027,961 | 6/1977 | Starkweather | 355/3 R |
| 4,027,962 | 6/1977 | Mailloux | 355/4 |
| 4,070,089 | 1/1978 | Grafton | 355/8 |

FOREIGN PATENT DOCUMENTS

| | | | |
|---|---|---|---|
| 1003483 | 1/1977 | Canada | 355/14 |

*Primary Examiner*—Roland E. Martin, Jr.
*Assistant Examiner*—John L. Goodrow
*Attorney, Agent, or Firm*—Michael H. Shanahan

[57] ABSTRACT

Reproductions of originals are obtained electro-photographically by exposing a charged photoconductor sequentially to at least two electro-optically regulated laser beam exposures, each exposure representing a separate color component of the original. Full color reproduction is possible.

Alternatively a laser beam exposure may be accompanied, preferably substantially simultaneously, by exposures from either an opaque original or a transparency or both.

8 Claims, 2 Drawing Figures

ELECTROPHOTOGRAPHIC PRINTING SYSTEM

BACKGROUND OF THE INVENTION & PRIOR ART STATEMENT

An electrophotographic color copier, commercially available as the Xerox 6500 color copier, adapted to produce a series of electrostatic latent images corresponding to a particular color component of an original, usually to be developed by a toner corresponding to the same color of the original, to provide a composite full color reproduction of the original is basically described in Davidson U.S. Pat. Nos. 3,906,897 and 3,934,549 and Sheikh U.S. Pat. No. 3,936,182. In such a system each partial color electrostatic latent image is developed typically with toner particles corresponding in color to the partial color image of the original. Typically three separate, color separated exposures and developements are made for example of the colors magenta, yellow and cyan and then the color separated toner images are transferred sequentially in registration to a sheet of paper to form a full color reproduction of the original.

Using such an electrophotographic color copier to make a color print of a color transparency is described in Mailloux U.S. Pat. No. 4,027,962. Cherian U.S. Pat. No. 4,014,607 describes apparatus for conveniently exposing either from a color transparency or an opaque original.

Bestenreiner et al. U.S. Pat. No. 3,780,214 describes scanning color originals point by point or line by line by electro-optical means to generate several sets of signals, each of which is used to regulate a laser beam in accordance with the distribution of a different color in the original. The laser beam exposures form thermal images representative of correspondingly colored portions of the original which may be superimposed over each other and transferred to a strip of paper to form a full color superimposed image.

A laser printer which includes a galvanometer for deflecting a modulated laser beam across a photoreceptive layer of an electrophotographic copier producing a visible image of the input signal is described in Mason Canadian Pat. No. 1,003,483.

IBM Belgian Pat. No. 846,804 published 1/17/77 and Starkweather U.S. Pat. No. 4,027,961 describe electrophotographic apparatus with a projection exposure station and a data-controlled light beam scan-printing station.

However none of the above patents discloses the preferred system of this invention which includes a relatively inexpensive, simple and compact data controlled laser scan apparatus adapted to be fitted e.g., as an accessory to existing commercially available electrophotographic copiers and preferably electrophotographic color copiers with a minimum of effort.

SUMMARY OF THE INVENTION

It is an object of this invention to provide an electrophotographic printing system utilizing exposure of a charged photoreceptor sequentially to at least two electro-optically regulated laser beam exposures, each exposure representing a separate color component of the original.

It is a further object of the invention to provide an electrophotographic printing system with more capability and flexibility for image and color composition for example by reason of separate, and preferably substantially simultaneous, laser, reflected copy and transmission copy exposures in the same process and machine.

The foregoing objects and others are accomplished in accordance with this invention by making reproductions of originals electrophotographically by exposing a charged photoconductor sequentially to at least two electro-optically regulated laser beam exposures, each exposure representing a separate color component of the original. Full color reproduction is possible.

Alternatively a laser beam exposure may be accompanied, preferably substantially simultaneously, by exposure from either an opaque original or a transparency or both.

BRIEF DESCRIPTION OF THE DRAWINGS

For a better understanding of the invention, as well as other objects and further features thereof, reference is made to the following detailed disclosure of this invention taken in conjunction with the accompanying drawings wherein.

DESCRIPTION OF THE PREFERRED EMBODIMENTS

Figure 1:
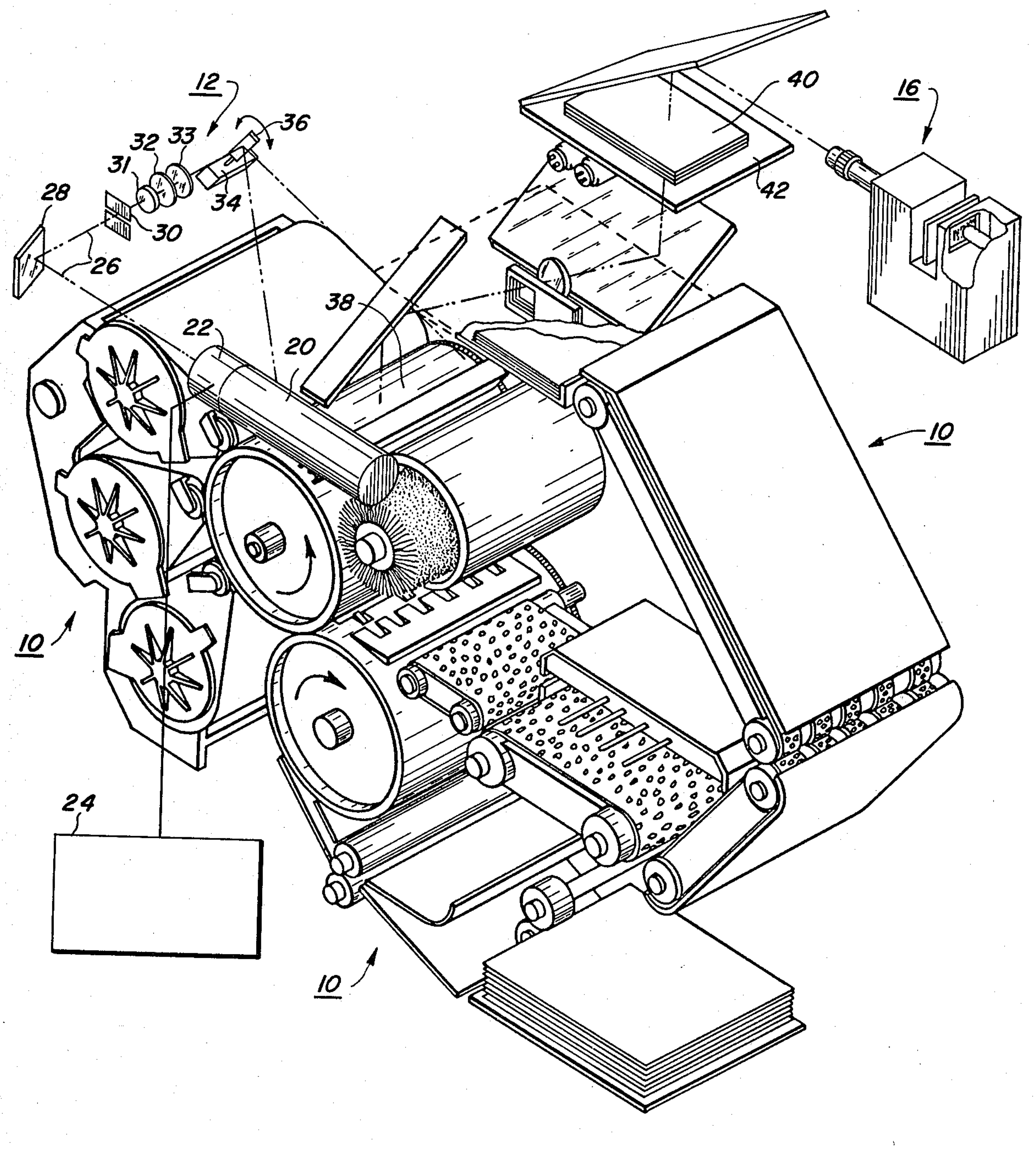
FIG. 1 is a perspective view of a preferred embodiment of the laser exposing apparatus of this invention in a preferred embodiment of a color copier which also has capability of reflection copy exposure from an opaque original which may be full color or transparency exposure input which may be full color or both, the laser exposure occuring substantially simultaneously with any other exposure.

Referring now to FIG. 1, the electrophotographic color printing system of this invention is broadly shown as composed of laser exposure system 12, color transparency exposure system 16 and the remainder of the electrophotographic color printer 10. Opaque original i.e., reflection copy exposure takes place by removing items 40, used in transparency exposure from platen 42 putting the opaque original face down on transparent platen 42 and activating the color printer 10.

It will be appreciated that when opaque original and transparency exposures are to be made from the same flow scan, that items 40 can be custom shaped to correspond to the desired transparency input on part of the platen 42 to complement and fit with the desired opaque original input contacting other parts of platen 42.

The remainder of the color printer 10 and reflection copy exposure apparatus and process are described in Davidson U.S. Pat. Nos. 3,906,897 and 3,934,549 and Sheikh U.S. Pat. No. 3,936,182 which are hereby expressly incorporated herein by reference in their entirety.

Color transparency exposure system 16 and as it relates to copier 10 is described in my U.S. Pat. No. 4,027,962 and Cherian U.S. Pat. No. 4,014,607 which are hereby expressly incorporated herein by reference in their entirety.

LASER EXPOSURE SYSTEM 12

Laser 20 emits a beam of coherent radiation 26 which is modulated by acousto-optic modulator 22, in conjunction with slit and mask 30, controlled by signals stored e.g., on magnetic disc or tape in and received from computer 24. Any suitable conventional original image scanning means may be used to produce computer storable binary code with represents the original image.

When modulator 22 is "off" the laser beam is masked by slit and mask 30. When modulator 22 is "on" the laser beam is diffracted, the zero order diffraction being masked and the first order diffraction passing through the slit.

The off-on modulated laser beam 26 modulated by modulator 22 (when modulator 22 is "on") is reflected from mirror 28 through slit and mask 30, lens 31, 32 and 33 to galvanometer optical scanner 34 with mirror 36 which provides for the horizontal laser scanning of the charged photoconductor surface 38.

The laser beam may impinge on the photoreceptor surface 38 before, after or at the same place on the advancing photoconductor surface 38 as the flow scan exposure information from an opaque original or a transparency transmitted through platen 42. It is preferred to have the laser beam impinge substantially at the same place on the photoconductor surface and thus substantially simultaneously, e.g., within a few seconds and optimally within a second, of the flow scan exposure information in order to minimize the time necessary and photoconductor surface area necessary to make a reproduction.

Lens 31, 32 and 33 serve to expand the laser beam and spot focus it at the photoreceptor surface 38.

Computer 24 can be any suitable computer which provides the required video information to modulator 22 in synchronization with the operation of electrophotographic copier 10.

Suitable computers include for example Nova computers available from Data General Corp., Route 9, Southboro, Mass., 01772, and PDP11 series computers available from Digital Equipment Corp., Maynard, Mass., 01754, and a Xerox custom designed computer described in copending applications Ser. No. 800,370 filed May 25, 1977; Ser. No. 769,254 filed Feb. 16, 1977; and Ser. No. 518,555 filed Oct. 29, 1974 which three applications are all hereby expressly incorporated herein by reference in their entirety.

Any suitable conventional computer software may be used to coordinate computer 24 and copier 10.

The video signal from the computer 24 to modulator 22 can come from any suitable source not only stored computer video signal information but also such information transmitted directly from an electro-optical scanner at a near or remote location.

Figure 2:
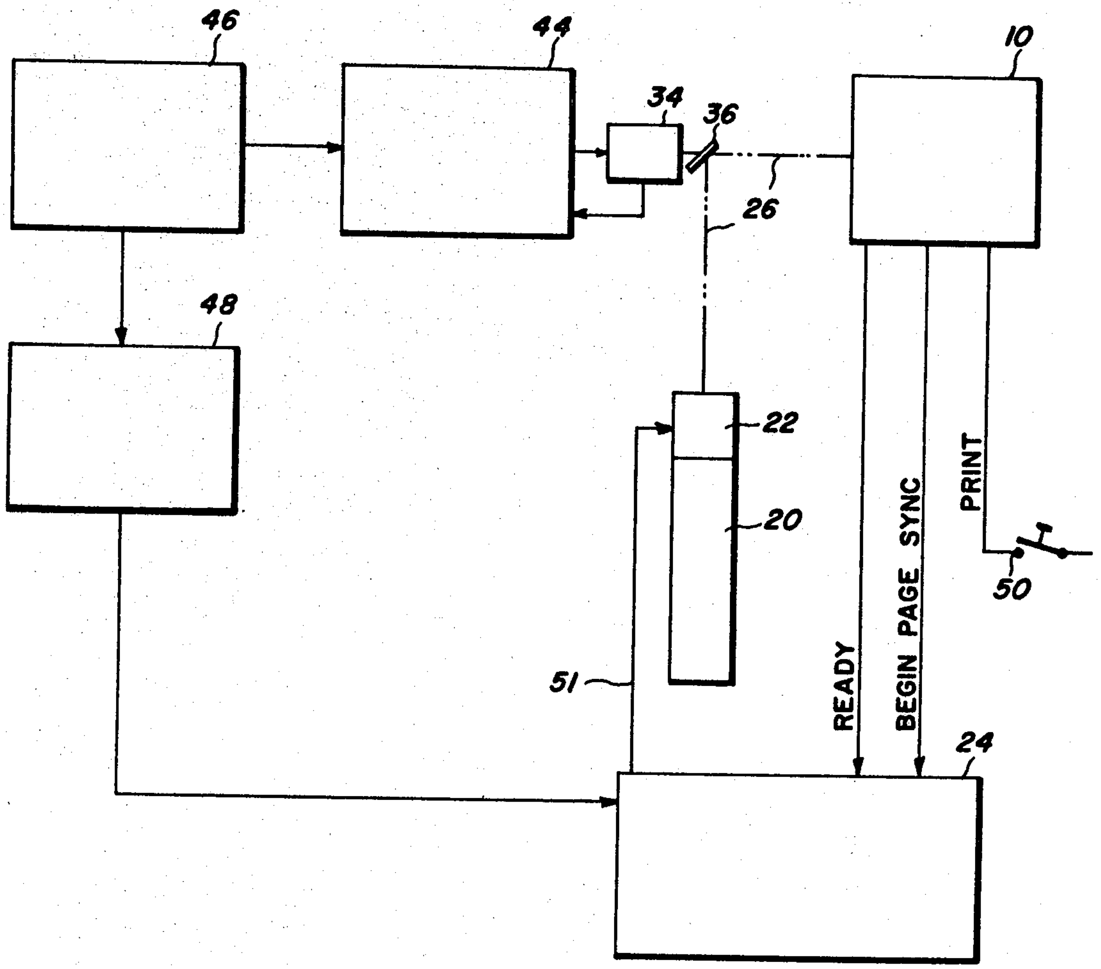
FIG. 2 is a block diagram showing the relationship and synchronization of the various components of the laser exposure system and the electrophotographic copier of this invention.

Referring now to FIG. 2, oscillator 46 generates two signals or wave forms. A sawtooth wave form is transmitted to servo controller 44 which generates the signal to drive galvanometer 34.

The second signal from oscillator 46 is transmitted to pulse generator 48 which transmits a delay or lag adjusted signal to computer 24, to synchronize transmission of the video signal 51 from computer 24 with the operation of galvanmeter optical scanner 34 and specifically to synchronize the begin of scan.

When remote print switch 50 is closed, a print signal is relayed to activate electrophotographic copier 10 which in turn ready signals computer 24. Then when the scan exposure starts in electrophotographic copier 10 a begin page sync signal is transmitted to computer 24 to synchronize transmission of video signals from computer 24 to modulator 22 with the flow scan exposure of electrophotographic copier 10. This permits the placing of the data controlled laser beam information on predetermined portions of the final print.

An electrophotographic color printing system as described herein was actually made in accordance with the invention and has the following makeup, which may be best described in reference to FIGS. 1 and 2.

Computer 24 is the Xerox Corporation proprietary computer described in the three aforementioned copending applications.

The electrophotographic copier 10 is the Xerox 6500 color copier.

The laser 20 and laser modulator 22 is a combined package commercially available from Coherent, Laser Division, 3210 Porter Drive, Palo Alto, Calif. 94304 and known as the Write Lite Cr-135 modulated laser which features a 2 mW Helium-neon (red light) 632.8 nm laser and an acousto-optic modulator in a single package. The modulator driver and laser power supply are also part of the commercial package.

Slit and mask 30 feature an about 1 mm opening formed by any two suitable sharp straight surfaces such as razor blades.

Lens 31 has a focal length of about 15.5 mm. Lens 32 has a focal length of 39 mm and lens 33 a focal length of 390 mm which is the distance from lens 33 along the light path to mirror 36 and photoconductor surface 38. All lenses are convex. Lens 31 and 32 serve to expand the laser beam and the lens 33 to spot focus the beam at the photoconductor surface 38.

Alternatively, lenses 32 and 33 may be replaced by a single convex lens of about 36 mm focal length.

Galvanometer optical scanner 34 is the G-100 PD Optical Scanner commercially available from General Scanning Inc. 150 Coolidge Avenue, Watertown, Mass., 02172. It is a moving iron galvanometer incorporating a position transducer which operates by detection of capacitance variation between the rotating armature and a set of stationary electrodes designed specifically for closed-loop operation.

The closed-loop galvanometer drive electronics use this position signal to improve and maintain the positional accuracy at the galvanometer mirror with respect to the oscillator drive voltage.

Start and end of scan signals (or timing) are derived from the oscillator drive voltage.

The galvanometer optical scanner was operated at 400 scans/second which at a photoreceptor surface advancing speed of 4 inches/second gives 100 scans/inch of advancing photoreceptor surface. The laser exposed the photoconductor surface 38 about $1\frac{1}{2}$ inches after any flowing scan exposure from the platen 42. Servo controller 44 is also commercially available from General Scanning, Inc., and is designated the CCX-100 Servo Controller.

Oscillator 46 is an HP 3301B from Hewlett-Packard Co., 1501 Page Mill Rd., Palo Alto, Calif. 99304. Pulse generator 48 is a Datapulse A100 from Datapulse Inc., Culver City, Calif.

Thus is provided an electrophotographic color printing system wherein the operator may choose any one of three different input exposures, data controlled laser beam, reflection exposure from an opaque original and transmission exposure from a transparency.

Also, two or three of said three different input exposures may be used substantially simultaneously and optimally simultaneously to compose and color compose a composite final print from the copier, portions of which are contributed from 2 or 3 different exposure inputs.

For example:

(a) A clean white mask on the platen may be used in reflection exposure to provide a final print with a clean white border assuming the use of a white final print support surface. Alpha numeric or form information either in color or black and white may be provided from exposure from a transparency; and pictorial information, position correlated, by any suitable conventional means, to the reflection and transparency exposure to prevent undesired overlap, i.e., optical double exposure, may be provided by data controlled laser beam to give a composite print.

(b) A mask on the platen may be used as in (a) above with the laser exposure selectively providing alpha numeric or pictorial information e.g., title or coding information in black and white or color at selected portions of an otherwise clean white border.

(c) Each of the three different exposure types may be used to provide alpha numeric or pictorial information, i.e., where one exposure is not used merely to mask or provide a pleasing border to the final print, to a single print.

Although specific components and descriptions have been stated in the above description of the preferred embodiments of the electrophotographic color printing system of this invention, modifications in the structure and the process steps of the preferred embodiments will occur to those skilled in the art upon a reading of the disclosure including:

(a) While typically the system hereof will be used to produce reproductions which exhibit color or colors e.g., blues, red, yellows, or combinations thereof it may also be used to produce reproductions entirely or partly in black and white.

(b) While a drum photoconductor configuration has been described herein, any suitable configuration may be used including a belt photoconductor including a single closed belt photoconductor. Especially with a belt photoconductor at flat portions thereof flash exposures rather than flow scan exposures may be used to transmit opaque and transparency information through a transparent platen to the surface of the photoconductor.

It will be understood that various other changes in the details, materials and arrangements of parts which have been herein described and illustrated in order to explain the nature of the invention will occur to and may be made by those skilled in the art upon a reading of this disclosure and such changes are intended to be included within the principle and scope of this invention.

What is claimed is:

1. Electrophotographic composite printing apparatus comprising a recyclable photoconductive member and charging means for uniformly, electrostatically charging the surface of the photoconductive member each cycle of the member in preparation for creation of a latent electrostatic image each cycle subsequent to the uniform charging of the surface of the photoconductive member, composite exposure means for exposing to electromagnetic radiation the charged surface of the photoconductive member for creation of latent electrostatic images thereon, the composite exposure means including optical projection means for exposing a first selected region of the uniformly charged surface during a cycle of the photoconductive member to an electromagnetic radiation image of an original projected onto the first selected region by means including a projection lens for creating a first latent electrostatic image and laser exposure means for exposing a second nonoverlapping region of the charged surface, during the same cycle of the photoconductive member that the first region is exposed, to a data controlled raster scan image created by a moving spot of electromagnetic radiation generated by a laser for creating a second latent electrostatic image which with the first latent image comprises a composite latent electrostatic image, development means for substantially simultaneously developing with toner material the first and second latent electrostatic images during the same cycle of the photoconductive member that the first and second charged regions are exposed for creating a visible composite toner image corresponding to the composite latent image and transfer means for transferring the composite toner image to a support member during the cycle of the photoconductive member in which the toner image is created.

2. The apparatus of claim 1 wherein the laser and projection exposure means are aligned relative to the photoconductive member for substantially simultaneous exposure of the first and second regions of the charged surface of the photoconductive member for creation of the composite latent image.

3. The apparatus of claim 1 wherein said photoconductive member is a drum mounted for rotation and wherein the transfer means includes registration transfer means for transferring a first composite toner image to a support member during one cycle and for transferring a second and subsequent composite toner images made respectively during second and subsequent cycles to the same support member in registration with the first composite toner image.

4. The apparatus of claim 3 wherein said development means includes magenta toner developer means for developing a first composite latent image generated during a first cycle of the photoconductive member with magenta toner material, yellow developer means for developing a second composite latent image generated during a second cycle of the photoconductive member with yellow toner material and cyan developer means for developing a third composite latent image generated during a third cycle of the photoconductive member with cyan toner material whereby a full color composite image is obtained following transfer to a support member of magenta, yellow and cyan toner images.

5. The apparatus of claim 1 wherein the projection exposure means includes means for projecting images of opaque originals to the photoconductive member.

6. The apparatus of claim 1 wherein the projection exposure means includes means for projecting images of transparency originals to the photoconductive member.

7. The apparatus of claim 1 wherein said projection exposure means includes means for projecting simultaneously non-overlapping images of an opaque and transparency originals.

8. The apparatus of claim 1 wherein said laser exposure means includes a galvanometer optical scanner and an accousto-optical modulator wherein the scanner sweeps a laser beam over the second selected region of the charged surface and the modulator selectively varies the instantaneous intensity of the laser beam.

* * * * *